(12) United States Patent
Konomi

(10) Patent No.: US 7,077,536 B2
(45) Date of Patent: Jul. 18, 2006

(54) DOUBLE-SIDED EDGE LIGHTING-TYPE DISPLAY LIGHT BOX

(76) Inventor: Apostol Konomi, 172 Dorchester St., Apt. 1, South Boston, MA (US) 02109

(*) Notice: Subject to any disclaimer, the term of this patent is extended or adjusted under 35 U.S.C. 154(b) by 738 days.

(21) Appl. No.: 09/824,966

(22) Filed: Apr. 3, 2001

(65) Prior Publication Data
US 2001/0022721 A1    Sep. 20, 2001

Related U.S. Application Data

(63) Continuation-in-part of application No. 09/487,122, filed on Jan. 19, 2000, now abandoned.

(51) Int. Cl.
*G01D 11/28*    (2006.01)

(52) U.S. Cl. .................. 362/29; 362/608; 362/613; 362/614; 362/223; 362/225; 362/236; 362/244; 362/327

(58) Field of Classification Search ............... 362/602, 362/604, 608, 29, 223, 225, 227, 235, 240, 362/241, 244, 327, 31; 40/546, 564, 572, 40/577, 29
See application file for complete search history.

(56) References Cited

U.S. PATENT DOCUMENTS

| | | | | |
|---|---|---|---|---|
| 1,550,001 A | * | 8/1925 | Reininger | 40/572 |
| 1,931,577 A | * | 10/1933 | Easterday et al. | 40/572 |
| 2,095,558 A | * | 10/1937 | Oberacker | 40/546 |
| 3,409,765 A | * | 11/1968 | Trame | 362/31 |
| 4,385,343 A | * | 5/1983 | Plumly | 362/31 |
| 5,151,679 A | * | 9/1992 | Dimmick | 340/326 |
| 5,283,673 A | * | 2/1994 | Murase et al. | 359/49 |
| 5,618,095 A | * | 4/1997 | Kashima et al. | 362/31 |
| 5,625,968 A | * | 5/1997 | Ashall | 40/546 |

* cited by examiner

Primary Examiner—Sandra O'Shea
Assistant Examiner—Sharon Payne
(74) Attorney, Agent, or Firm—Lambert & Associates; Gary E. Lambert

(57) ABSTRACT

The double-sided edge lighting-type display sign of the present invention comprises at least two illuminating light sources: two or one display signages; and a light-directing panel. Preferably, a display sign housing accommodates and supports the other elements of the present invention. Namely, the light box housing supports at least two light sources, the display signages and the light-directing panel. The light-directing panel of the present invention is at least partially light reflective and at least partially light passing. The light directing panel directs and redirects light from the included at least two edge lighting-type light source to the included display signages. The light ultimately incident on the display signages is greater than it would normally be without the light-directing panel.

7 Claims, 10 Drawing Sheets

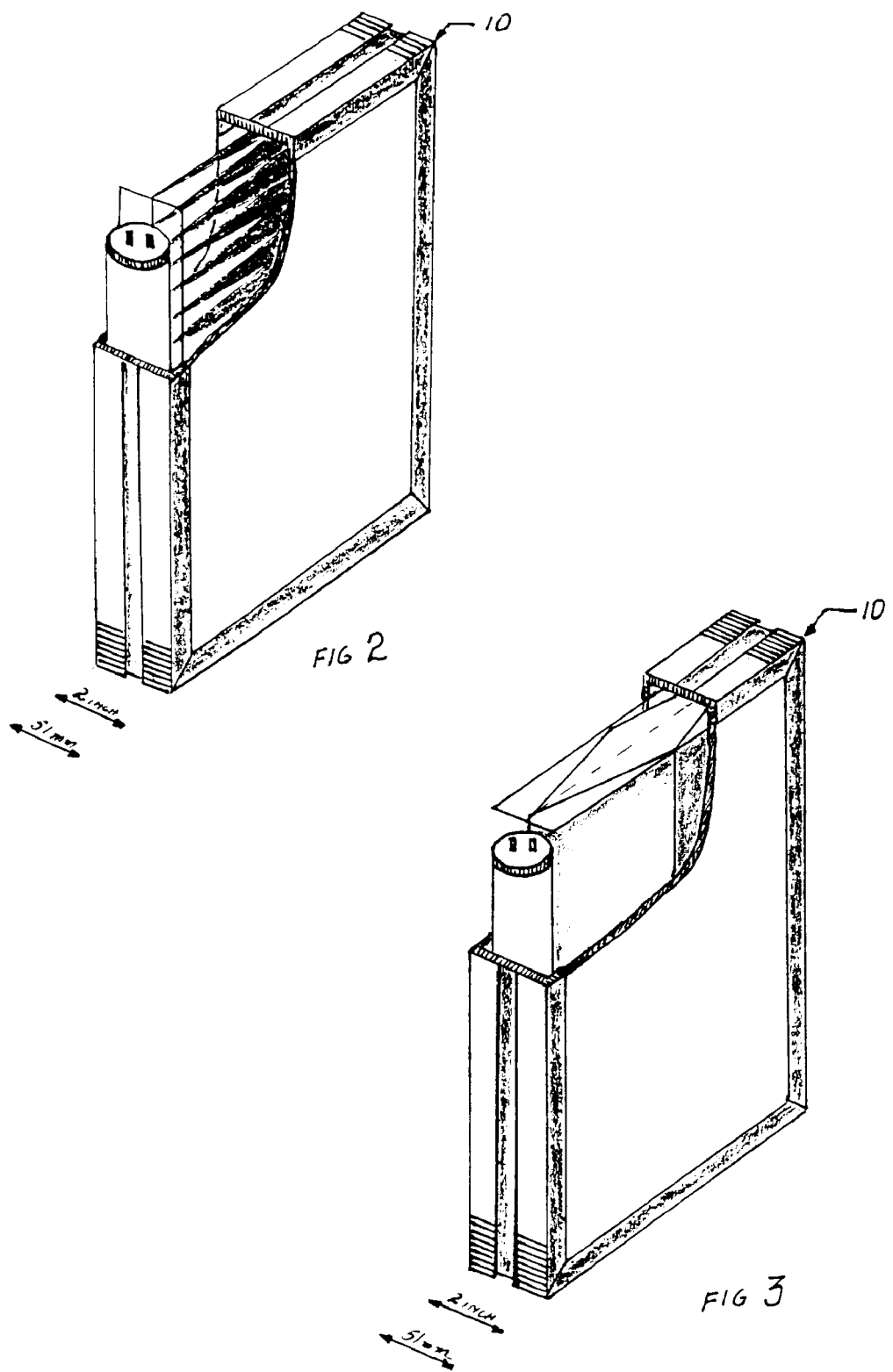

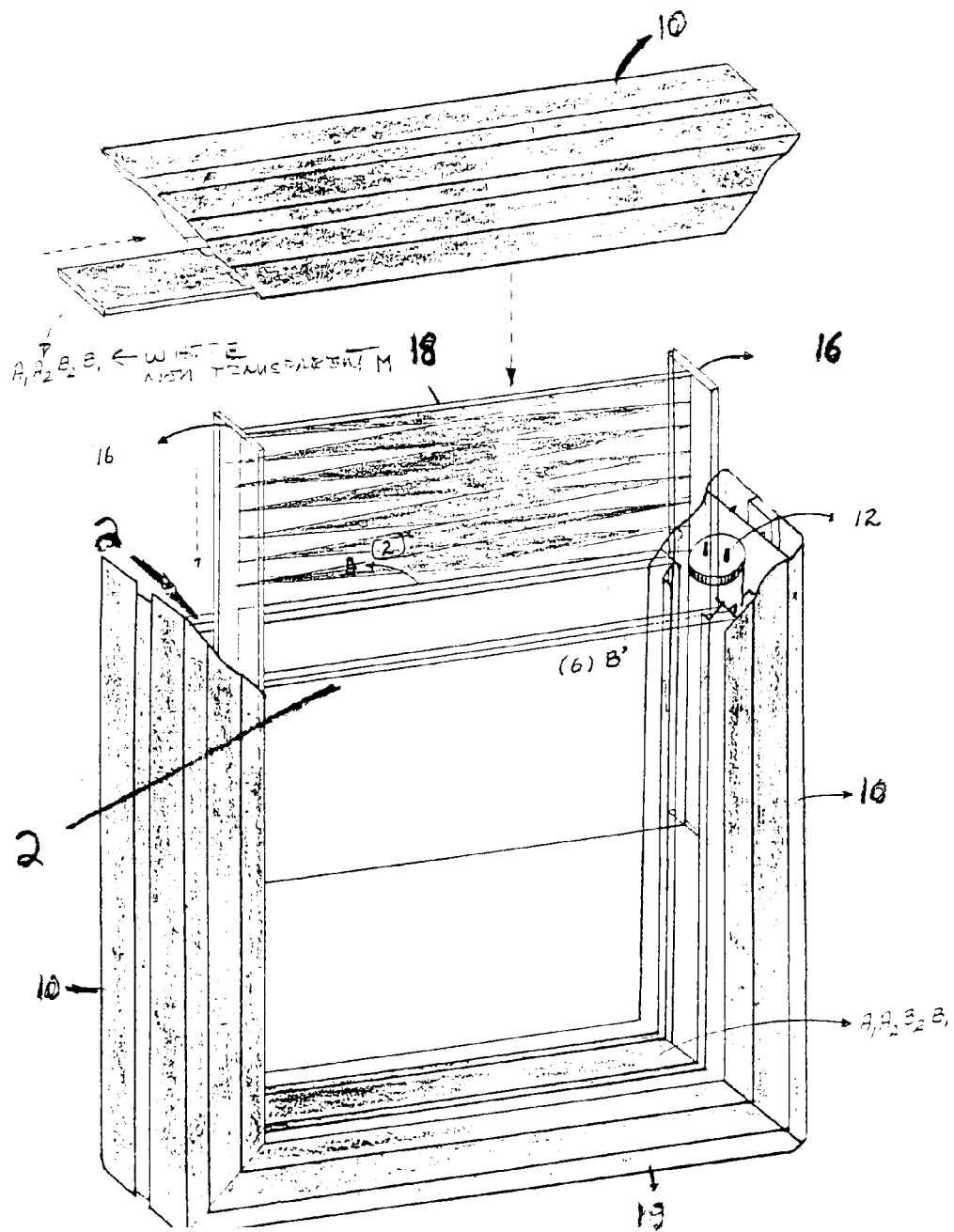

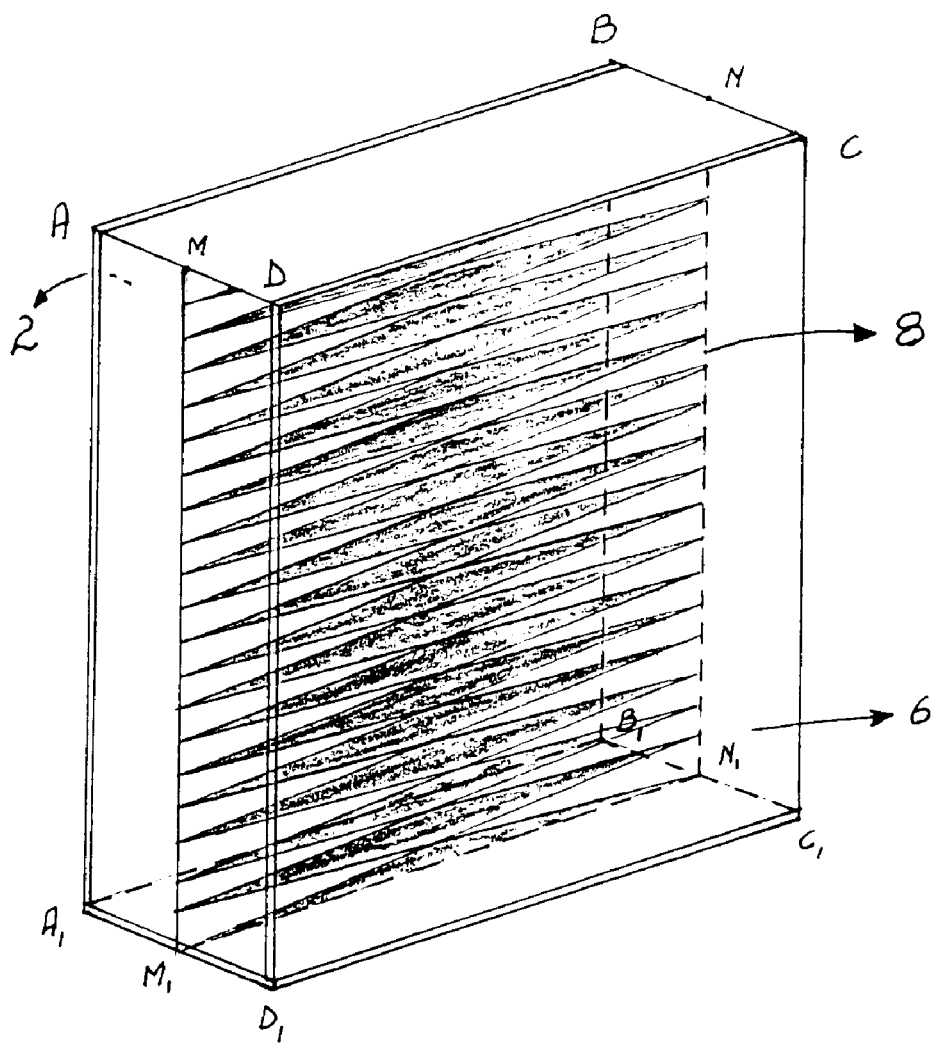

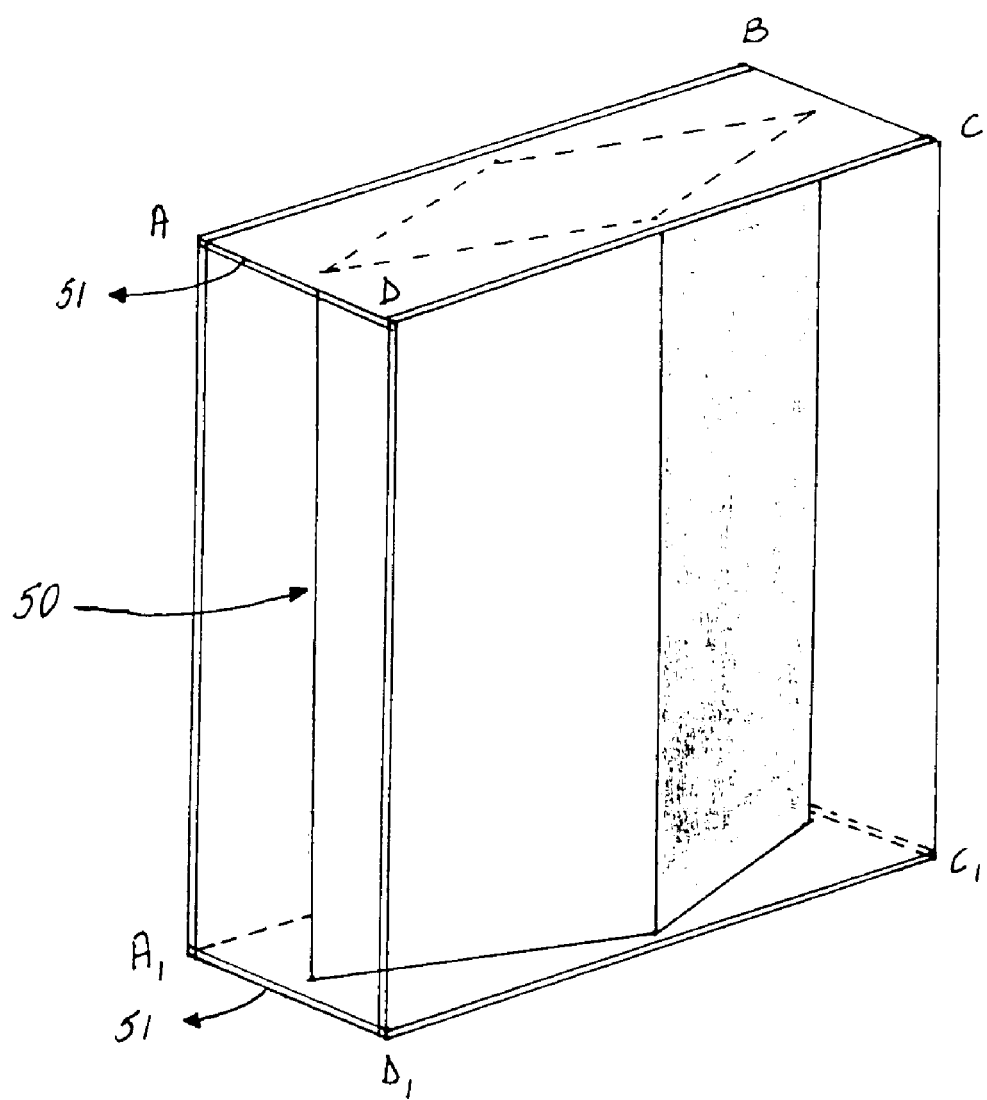

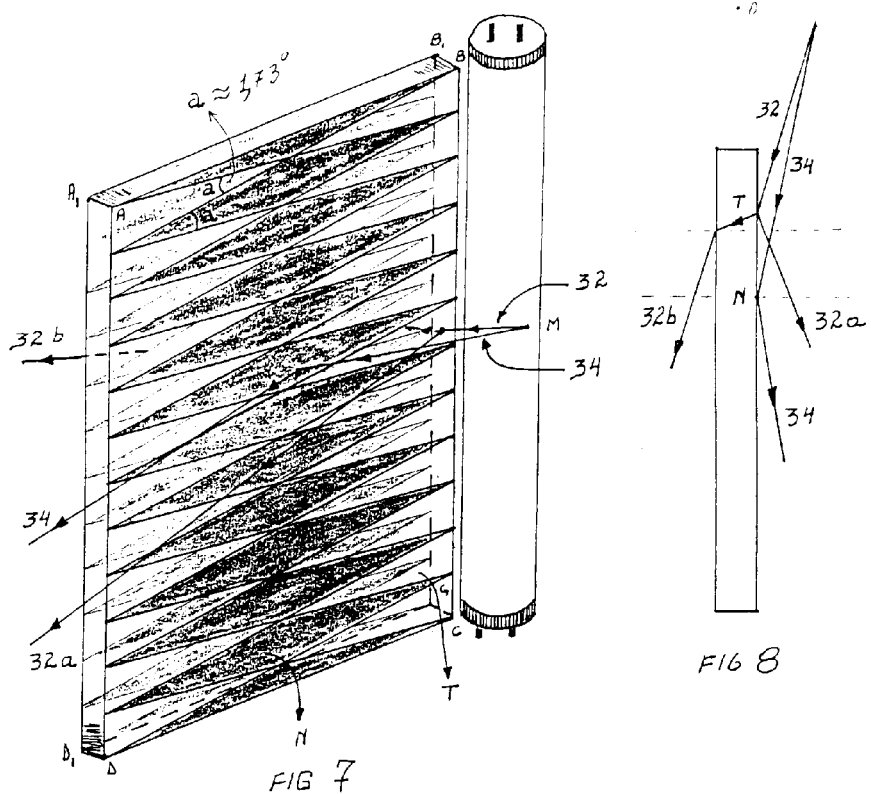
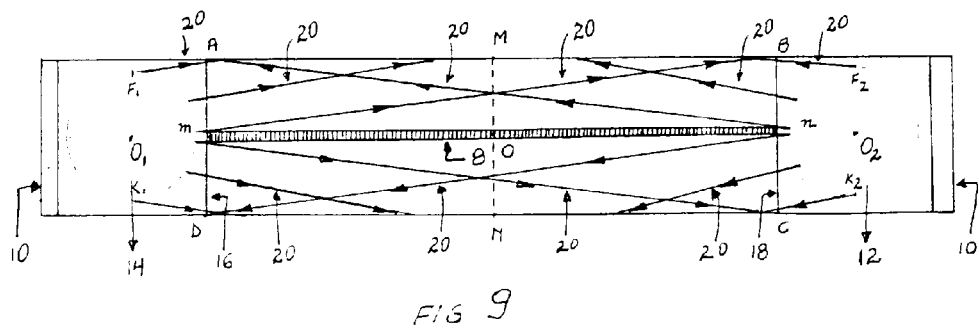

DOUBLE-SIDED EDGE LIGHTING-TYPE DISPLAY LIGHT BOX

CROSS REFERENCE TO RELATED APPLICATIONS

This application claims the benefit in the form of a continuation-in-part under 37 CFR 1.53(b)(1) of currently pending parent application. Ser. No. 09/487,122 filed Jan. 19, 2000 now abandoned by the same inventor.

BACKGROUND OF THE INVENTION

The present invention relates generally to illuminated displays and light boxes. In particular, the present invention relates to an edge lighting-type display light box that illuminates two different signs that are placed and viewable from both the front and the rear of the light box.

The traditional light boxes typically illuminate signs and other displays by backlighting the display sign. Usually, a number of bulbs are supported within the light box housing. The light box housing typically has one side consisting of the sign and graphics that are backlit and illuminated by the bulbs supported in the interior of the light box. A problem encountered with backlit light boxes is that the display sign is not uniformly lit, nor brightly lit, both of which are desirable for maximum view-ability of the display signs. Some light boxes include light-directing panels in the interior of the light box for reflecting light that originates from the bulbs, towards the display sign. Although the light-directing panels are supposed to reflect additional light from the bulbs towards the display sign and improve the amount of light thereon, the result is not uniform brightness over the entire display sign viewing area. The areas of the display sign directly in front of the light bulbs are still illuminated brighter than other parts of the display sign.

Using more bulbs or brighter bulbs in order to reduce the variations in illumination of the display sign is costly to implement and maintain. Specialty bulbs, such as those that provide a relatively high amount of light, are more expensive than standard bulbs. Since display signs are routinely activated for extended periods of time, the cost of the maintenance of the light box using specialty bulbs can be significant over the life of such a light box. Increasing the number of bulbs and light-directing panels in an attempt to increase the brightness of the light of the light illuminating the light box display sign also increases the costs of design and maintenance of the light box.

Many prior light box systems utilized only a single mechanism and attempted to augment the lighting mechanism with the use of reflective materials installed or painted on the interior walls. Due to phenomenon such as cancellation of light rays and also the finite travel capabilities of the rays, an uneven lighting scheme will occur when utilizing these prior systems.

A further concern with traditional light boxes is the overall size of the light box housing. Prior light box housing designs were customarily bulky in order to accommodate the bulbs behind the display sign area and the necessary electrical components supplying power to the box light. Another factor contributing to the necessary bulkiness of backlit light boxes is the need to keep the display signs some distance away from the included bulbs so that the display sign or signs are not degraded due to the heat extroverted from the light bulbs. While the traditional light box illuminates the display signs with bulbs placed behind a single display sign, double-sided light boxes backlit opposing display signs by sandwiching the light bulbs between the two opposing display signs.

For the same reasons given above, the housings for traditional double-sided light boxes are at least as deep as single-sided backlit light boxes. As an alternative to prior bulky light box designs, neon signs have been utilized. Neon signs utilize expertly bent tubes of inert gas that are luminous when excited by electricity to create display signs. Although neon signs, regardless of the particular inert gas used to fill the luminous bent tubes, provide appealing visual displays, they have a number of disadvantages. Neon signs are expensive to manufacture and must normally be serviced by skilled technicians due to the high voltages required for their function. Another major disadvantage of neon lights revolves around the permanent nature of the graphic. Once the graphic is constructed, a skilled craftsman could possibly re-bend the tubes to reflect a new message, but this would be costly and would quickly wear on the glass.

SUMMARY OF THE INVENTION

The double-sided edge lighting-type display box of the present invention addresses and overcomes the above-mentioned problems. Specifically, the present invention presents a light box that uses standard light sources supported along at least one peripheral edge of the display sign to illuminate display signs on one or two opposing faces of the display sign.

With regard to the above-mentioned limitations of prior light box systems utilizing only a single lighting mechanism and reflective materials installed or painted on the interior walls, the present system eliminates the quandaries encountered regarding cancellation of rays and travel distance, with a tangible, mathematically sound solution. In the double-sided edge lighting system, the light rays provided are not left to spurious travel, to then later be refracted. Neither are the rays merely reflected off of the housing and then left to free travel, which obviously leads to cancellation rays, and ergo, less illumination.

The double-sided edge lighting-type display sign of the present invention comprises a light box housing, at least two illuminating light sources, at most two display signs and a two-sided or four-sided light-directing panel. The light box housing accommodates and supports the other elements of the present invention. Namely, the light box housing supports at least two light sources, the display signs and the light-directing panel. In addition to supporting the above-listed elements, the light box housing also includes provisions for supporting the electrical components responsible for supplying and controlling the electrical operation of the light box. In one embodiment of the present invention, the light box housing is formed of rigid material substantially forming a box that accommodates the majority of the electrical components of the light box. In this manner, the illuminating light from the included light source is not obstructed by any electrical components and the amount of light available for illuminating the light box display signs is maximized.

The light source of the present invention is located along at least one edged of the light box housing. By locating the light source along the edges of the light box housing, the required depth of the light box disclosed herein can be kept to a minimum. Thus, the light box needs only to be as thick as the light sources housed herein. In one embodiment of the present invention, the light source is a pair of standard fluorescent light bulbs located along opposing edges of the light box housing. Since standard fluorescent light bulbs are not very wide, the depth of the light box can be kept to a minimum. Additionally, this embodiment can be easily serviced, since the voltages and components normally used in fluorescent bulb circuits do not require a skilled or certified technician for replacement or servicing thereof. The light source for the present invention is not limited to fluorescent bulbs or any other particular light source disclosed herein. By way of example only and not as a limitation, the light source may be incandescent bulbs, krypton bulbs, bar lighting, fiber-optic lights, as mentioned fluorescent bulbs, or any other light source.

The light source of the present invention should optimally provide a uniform distribution of light across the entire display signs area so that the display signs are uniformly illuminated. Uniform dispersion of the usable light, provided by light source, may be achieved by using reflective housing in the regions surrounding the light source so that light rays tending not to be directed towards the display signs are redirected toward the display signs or a light-directing panel or panels, discussed in greater detail below. In one embodiment, the light housing surrounding the light source is formed of reflective material or coatings such that rays of light not originally directed toward the display signs or the two-sided light-directing panel are reflected and redirected toward display signs or the light-directing panel. In addition to the redirecting reflective housing for redirecting light rays toward the display signs or the light-directing panel, one embodiment of the invention may encompass a light box housing including interior surfaces substantially coated with reflective coatings, designed so that light rays not initially directed towards the display signs or two sided light-directing panels, are redirected thereto.

The display signs of the present invention comprise transparent or semi-transparent panels coated with a desired graphical design display. The display signs are usually placed on at least a portion of what constitutes at least one face of the light box housing. Light from the included light source located along the edge of the light housing, backlights the display signs. The display signs in one embodiment are comprised of the desired graphical design, which is stamped on the face of a transparent film or paper material. This genre of display sign possesses the characteristics of being easily and inexpensively manufactured and replaced. Included within this grouping of display sign is X-ray radiographs. It is therefore clear that the present invention may be adapted for many uses other than displaying advertising signs and is thus not limited to any one application.

The display signs used in the present invention may be designed to be weather-resistant and protect against fading, peeling or other degradations where the light box would be exposed to the elements of the sun, heat, cold, moisture, etc. Alternatively, the display signs may be constructed with a protective panel next thereto for protecting the display signs from weather elements.

The light-directing panel of the present invention functions to effectively direct a maximum amount of the useable light from the included light source towards the display signs. The display signs are therefore illuminated with the maximum amount of useable light provided by the light source. This results in two backlit display signs that are more visible than conventional light boxes and thus, a better light box system. The double-sided light-directing panel of the present invention may comprise a panel, having portions thereof coated or treated with a material having an index of refraction greater than the index of refraction of the uncoated or untreated portion of the light-directing panel. The light-directing panel, thus functions to direct light rays incident to its coated surface, toward the display sign, located on the side adjacent to the origination point of the light ray. The light-directing panel of the present invention also allows light incident upon the uncoated portions of the light-directing panel to pass through the light-directing panel and illuminate the display sign located on the side opposing the origination point of the light ray. In this manner, the display signs of the present invention are illuminated with the maximum amount of the light from the light source.

In one embodiment of the invention, the amount of surface area having a higher index of refraction than the uncoated, two-sided, light-directing panel approximately equals the amount of surface area of the uncoated two sided light-directing panel. The advantage of this embodiment is that the light incident on either side of the light-directing panel has an equal chance of either being directed back toward the display sign located on the same side as the light ray origination point or passing through the uncoated and lower index of refraction portion of the light-directing panel light towards the display signs located opposite the origination point of the light-directing panel. The opposing display signs therefore, are equally and uniformly illuminated, by the uniformly dispersed light, created by the light source as described above.

In prior light box systems, the positioning of the lamps behind the image creates a lighting scheme encompassing bright rays and less bright rays. Due to the uneven lighting of the object, which occurs with the differing strengths of rays, a means to reconcile the strength of the rays, in order to best serve the dual image configuration of the instant invention, must be developed. Thus, in a further embodiment, the double edge light display sign allows for better illumination of the two signs, by utilizing a prismatic shaped, four-sided light-directing panel. The four-sided light-directing panel creates a higher intensity, more uniform illumination, by augmenting the rays with the farthest distance to travel. This is accomplished through the angling of the panel sides towards the sign, as the distance a ray must travel from the source increases.

The base of the prismatic light-directing panel may be made in the shape of a rhombus and the prismatic light-directing panel may be manufactured from smooth white plastic. The prismatic light-directing panel may be opaque or painted with a white fluorescent paint in order to exhibit stronger and fuller reflective qualities.

This embodiment serves as a better means for illumination since the prismatic light-directing panel allows for the back-to-back construction of the display signs and uniform lighting, without each display sign interfering with the other's lighting scheme. This embodiment also allows for a very thin unit as compared to prior art units. In the present embodiment, the panel's width can range from 1.5 to 2.5 inches or specifically 37 to 65 mm.

In the traditional light boxes, the positioning of the lamps behind the image inherently creates a lighting scheme encompassing some highly radiant rays and some less radiant rays, due to the direct application of the lamps. The laws of physics, through the equation $E=1 \cdot \cos a/R^2$, dictate that the further away the source of light, the less illumination is present. However, the placement of many lamps behind the picture for a brighter illumination, not only increases the cost of production, but also makes the construction difficult to manage. Also, in order to house two opposing pictures, the panel would have to be thicker and larger, and thus harder to move and maintain when malfunctions occur. A mechanism, such as the one just described above, may also require a specialist for repair and replacement of the pictures. Also, the utilization of many lamps is economically inefficient since the increase in the consumption of electrical energy can be extensive.

To eliminate these disadvantages, a system with two fluorescent lamps, placed on the side of the displays and inside the aluminum frame may be introduced. Due to the novel construction of the instant display sign, the profile plays a major role in the function of the sign. The sign is designed with such a narrow width that it is easy to move, and fit into tight spaces. The owners themselves can change the display signs with little difficulty, and thus, the instant display sign saves electrical energy, along with providing maximum and uniform illumination of the two displays.

The construction of this instant display sign is based upon symmetry. This is achieved with the aid of the four-sided light-directing panel, which, with its rhombus shape, helps to channel the quantity of the rays that are needed for the illumination of the two displays of the panel. On the two displays, except for the quantity of rays that fall from the two lamps, there is also a quantity that is sent from the light-directing panel with reflected rays, in this way intensifying the illumination of the rays. When the lamps are placed on the sides of the two displays, without a light-directing panel in between them, the displays are well lit on the sides and gradually less lit in the middle. This phenomenon is eliminated with the use of the four-sided light-directing panel. The displays not only have stronger illumination, but are also illuminated more uniformly and symmetrically.

Here, it is important to stress that this strong and uniform illumination is achieved by having the lamps not too far from each other. This depends on the quantity of the lamps.

When the intensity of the light from the lamps is greater, naturally, the distance between those two lamps can be proportionally greater. From experimentation, it has been determined that the distance between the two lamps should not be greater than 0.6 to 0.65 of their length. For example, if the lamp is 30 inches long, then the distance between the lamps should be around 18 to 20 inches. The four-sided light-directing panel, being a prism with a rhombus shaped base, possesses four symmetric, reflective surfaces. These four surfaces of the panel aid in the reflection of the rays from the lamps to the display signs, and for this reason, near perfect reflection may be exhibited. This is achieved due to the construction of the four symmetric sides, which may be made of white plastic, opaque (non-transparent) or painted, with a fluorescent white paint as seen on reflective street signs. The sides of the four-sided light-directing panel can also be made of mirror quality glass, but the cost would be much higher.

As such, the method of making and using the device detailed above constitutes the inventor's preferred embodiment and alternate embodiments to the invention. The inventor is aware that numerous configurations of the device as a whole or some of its constituent parts are available which would provide the desired results. While the invention has been described and illustrated with reference to specific embodiments, it is understood that these and other embodiments may be resorted to without departing from the invention. Therefore, the form of the invention set out above should be considered illustrative and not as limiting the scope of the following claims.

BRIEF DESCRIPTION OF THE DRAWINGS

FIG. 2 is a cutaway perspective view of the double-sided edge lighting-type display with the double-sided light-directing panel that is transparent at some places and non-transparent at others.

FIG. 3 is a cutaway perspective view of the double-sided lighting-type display with the symmetric, four-sided light-directing panel.

FIG. 4 is a cutaway perspective view of the double-sided edge lighting-type display box and its main parts, along with the double-sided light-directing panel.

FIG. 5 is a perspective view of the light box depicting the plastic parts of the double-sided edge lighting-type display box with the double-sided light-directing panel installed.

FIG. 6 is a perspective view of the light box depicting the above-mentioned plastic parts of the double-sided edge lighting-type display box with the four-sided light-directing panel installed.

FIG. 7 is a perspective view of the double-sided light-directing panel where the darker parts are the non-transparent parts ("N") of the said double-sided light-directing panel, and the lighter parts are the transparent parts ("T") of the double-sided light-directing panel. This figure is also a depiction of a ray that falls on the non-transparent section of the panel and a ray that falls on the transparent section of the panel.

FIG. 8 is a detailed side view of the said light-directing panel showing the rays that fall upon the T parts of the panel and the N parts of the panel.

FIG. 9 is a cutaway plan view of the light box depicting of the rays originating from the two lamps that fall directly on signs AB and CD.

DETAILED DESCRIPTION OF THE PREFERRED EMBODIMENT

In the application we will try to illustrate the design and function of the double-sided edge lighting-type display box. In traditional double-sided or single-sided light boxes, a number of fluorescent lamps are placed behind the picture or in between the two pictures. Whereas in the current invention there are two fluorescent lamps, placed on the sides of the signs and with the help of the said light-directing panels, the direction of the rays emitted by the lamps is changed so that they fall on the two signs and illuminate these signs. The most important feature of the lighting type display box is symmetry. This means that only two lamps are needed to uniformly illuminate two opposing signs, of the same light box, without their images interfering with the other. The entire design of the light box is symmetrical: the aluminum frame of the box, the placement of the lamps, the two display signs, as well as the light-directing panel, which is placed in the center of the box.

Figure 1:
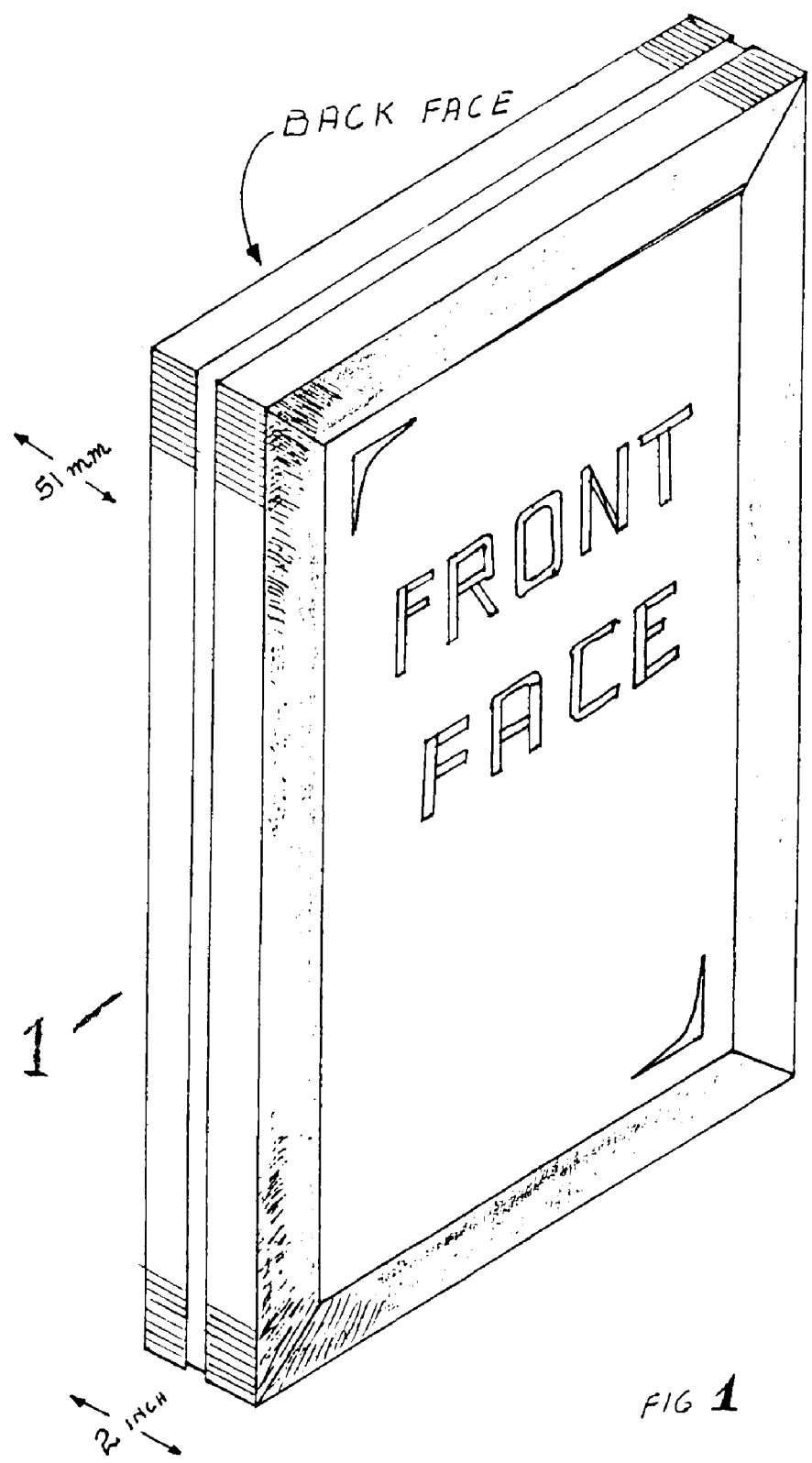
FIG. 1 is a perspective view of the double-sided edge lighting-type display box of 51 mm (2 inch) width.

Referring to the drawings, FIG. 1 is a perspective view of the double-sided edge lighting-type display box where only one of its two display signs is visible. The width of this box is dependent upon the fluorescent lamps to be used. The width may vary between 37 mm to 65 mm, depending on the lamp that is installed, since the lamps themselves have different diameters, ranging between 16 mm to 38 mm.

In FIG. 2, a cutaway, perspective view of the light box configured with the double-sided, light-directing panel in the center, which has its sides parallel to each other. FIG. 3 is a cutaway, perspective view of the light box with the prismatic, rhombus based, light-directing panel with the four symmetrical sides, each opposing side being parallel, located in the center of the light box. In both FIG. 2 and FIG. 3, the light-directing panels are placed in between the two lamps vertically, spanning parallel to an imaginary plane that can be drawn through axis between $0_1$ and $0_2$, the centers of the fluorescent lamps.

FIG. 4 offers a detailed view of the light box, illustrating the double-sided light-directing panel 8 and the manner in which the panel is positioned in the box. Two transparent sheets of plastic 16 and 18 are the means used to position the light-directing panel 8 tightly and keep the panel in the center of the light box 1. These two sheets 16 and 18 are slid in the aluminum frame 10 and placed in front of lamps 12 and 14. It can be observed that the double-sided light-directing panel 8 is parallel to the signs 2 and 6 of the double-sided edge lighting-type display box.

FIG. 5 is a perspective view of the box, illustrating all plastic parts that are used in the double-sided edge lighting-type display box, where also the double-sided light-directing panel 8 and the two display signs 2 and 6, that are symmetric in connection with this light-directing panel, are visible.

FIG. 6 depicts the plastic parts of the double-sided edge lighting type display box 1, illustrating the prismatic light-directing panel 50 with a rhombus shaped base and signs 2 and 6 are parallel to the long diagonal plane of the rhombic prism in the center and symmetric in connection with it.

In FIG. 7 the design and function of the double-sided light-directing panel are analyzed. The double-sided light-directing panel 8 is made of a transparent sheet of plastic with a length (AB), which is less than the distance between the two lamps and a height (AD) that is approximately equal to the height of the lit part of the fluorescent lamps. The thickness ($AA_1$) may range from 2 mm to 3 mm. As shown in FIG. 7, the transparent plastic sheet has sides ABCD and $A_1B_1C_1D_1$. The light-directing panel 8 is placed according to the plane of axis $0_1 0_2$ of the lamps and the thickness of the light-directing panel is designed to be smaller than the diameter of the fluorescent lamps, such that when emitted from the two sides of the two lamps, diagonal rays fall on the entire surface of the light-directing panel on both sides, meaning on surface ABCD and surface $A_1B_1C_1D_1$ rays fall from lamp 12 and 14. The majority of these rays are diagonal to the surfaces of the light-directing panel whereas another part of the rays is parallel to the surfaces of the light-directing panel.

In FIG. 7 for the purpose of illustration, we have used only lamp 12. From a point M of lamp 12, ray 32 falls on surface ABCD of the light-directing panel in a diagonal manner. The angle that is formed when the ray touches the surface of the light-directing panel is less than 90° and this ray will be reflected from surface ABCD of the light-directing panel, thus becoming ray 32a. However, since the light-directing panel 8 is transparent, the panel allows a part of this ray to go through it and to exit from its surface, $A_1B_1C_1D_1$. This portion of ray 32 becomes ray 32b. Therefore, ray 32 is divided into rays 32a and 32b, which fall on the two display signs. This phenomenon is further illustrated in FIG. 8, which is a side view of the ray 32, dividing on light-directing panel 8. This same division of rays takes place on both sides of the light-directing panel for all the diagonally traveling rays that originate from the two lamps and then fall on the two surfaces of the light-directing panel.

We know that the illumination of a surface, which means that with the extension of the distance that a ray must travel from the source of the light, the brightness is of that ray is lessened. Further, with the increase of the angle of the rays, again, the brightness is lessened. Thus, it can be stated that, at the horizontal midpoint of the light-directing panel 8, the natural illumination should be less than the illumination at a point closer to the lamps. In order to eliminate this problem, a part of surfaces ABCD and $A_1B_1C_1D_1$ of the light-directing panel, can be constructed of a non-transparent design, for example, by covering parts of the light-directing panel 8 with a thin white plastic piece or by painting parts of the light-directing panel 8 with white paint, as illustrated by the dark parts shown on Fig 7.

There will be rays originating from the lamps that will also fall on the non-transparent of surfaces ABCD and $A_1B_1C_1D_1$ of the light-directing panel that will be fully reflected from those surfaces. FIG. 7 also depicts an image of ray 34 which is also viewed schematically in FIG. 8. All the rays that fall on the non-transparent parts of the light-directing panel rays 34 are fully reflected towards the display signs of the light box, without undergoing division.

In FIG. 7 it is easily discernable that the surface area of the transparent section (T) of the one side ABCD of the light-directing panel is equal to the surface area of the non-transparent section (N) of this same side. Therefore $S_T = S_N$, which means that, from the rays that fall on surface ABCD, half of those are reflected and divided (32) and the other half is only reflected without undergoing division (34). For the varying angles, a, of the painted parts we have different illuminations of the signs. From the experimentation it has been shown that the best illumination of the signs occurs when the angle a of the painted parts (or the transparent parts) is 1.73°. The pained parts of the two surfaces of the double-sided light-directing panel 8, in this form, functions so that one picture of the double-sided edge lighting-type display box does not interfere with the other. If this light-directing panel is not utilized, then re-reflection of the rays from one display sign to the other would exist and thus a mix of the displays would result.

Now we analyze rays that originate from lamps 12 and 14 and how they are directed to signs AB and CD of the light box. To accomplish this, we cut the box, with the double-sided light-directing panel 8 of FIG. 2, with a horizontal plane, vertical to axis $0_1$ and $0_2$ of lamps 12 and 14.

In FIG. 9 we can see the aluminum frame 10 of the panel, lamps 12 and 14, their centers $0_1$ and $0_2$, light-directing panel 8, the two sides of the box, AB and CD and the fixtures 16 and 18 of the light-directing panel 8. The front parts $F_1 m K_1$ and $F_2 n K_2$ of the lamps 12 and 14, emit rays on the two signs of the double-sided edge lighting-type display box. Every point on the facing edge of the lamps is considered a light source, and thus rays are released in all directions spherically. However, for reasonability, this discussion will be limited to only the rays that are on the horizontal plane. On surface AB of the panel, there are rays that fall directly upon it, originating from points $F_1 m$ of lamp 14 and $F_2 n$ of lamp 12 whereas on surface CD there are rays that originate from part $mK_1$ of lamp 14 and $nK_2$ of lamp 12. These direct rays, 20, do not fall on the double-sided light-directing panel 8, which is located in the center of the light box. All these said rays 20 emit a specific illumination on surfaces AB and CD of the light box, the same for both surfaces and symmetric in connection with axis $0_1 0_2$ of the centers of the two lamps 12 and 14, as seen in FIG. 9.

But from points $F_1 m$ and $mK_1$ of lamp 14 and $F_2 n$ and $nK_2$ of lamp 12 also diagonal rays are emit that fall on the two surfaces of the light-directing panel 8 on their transparent parts (T) as well as on their non-transparent parts (N). Schematically, these rays fall on the two surfaces of the light-directing panel 8, as is exemplified in FIG. 10. All the rays that fall on the transparent parts (T) of both surfaces of the light-directing panel 8, the part of ray 32 that is reflected from the transparent parts (T) of the light-directing panel, ray 32a, and the part of ray 32 that passes through the light-directing panel 8 and illuminate the other signs of the box, ray 32b, provide illumination to the signs. The rays 34 that fall on the non-transparent (N) parts of both sides of light-directing panel 8, even after having been reflected, remain in the same state and thus will not undergo a division.

Figure 10:
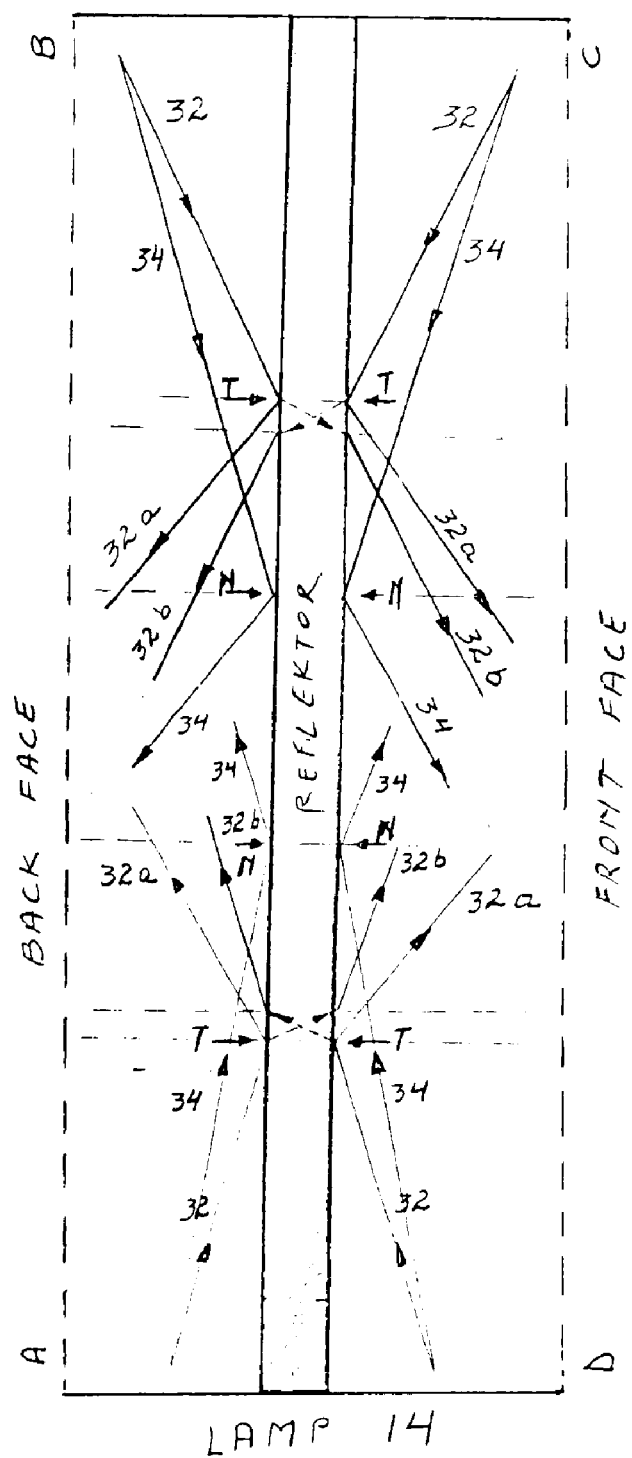
FIG. 10 is a cutaway plan view of the light box depicting the diagonal rays that originate from the lamps that fall on the double-sided light-directing panel on the transparent part T and on the non-transparent part N.

In FIG. 10 we can see that in the center area of the signs of the light box, there are more reflected rays, which naturally indicates that in the center of these signs, there is an increase in illumination, because the center of light-directing panel 8 is mainly non-transparent (N). This results in surfaces AB and CD being uniformly and symmetrically illuminated in connection to axis $0_1 0_2$ of lamps 12 and 14.

Figure 11:
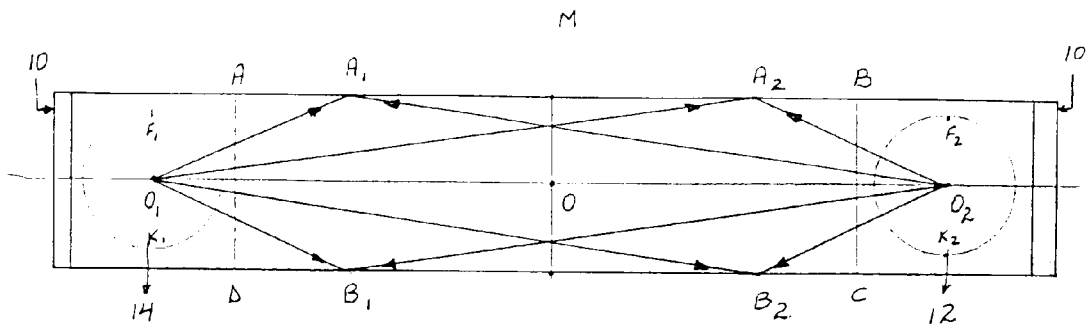
FIG. 11 is a cutaway plan view of the light box depicting the symmetrical points on the two signs AB and CD of the box, with the same illumination.

In order to better understand the illumination of surfaces AB and CD of the double-sided edge lighting-type display box 1, we refer to FIG. 11. In FIG. 11, which illustrates a horizontal cut of the panel, it can be noticed that $0_1 0_2$ and MN are symmetrical axes of the panel and center O is a symmetrical center to the box, which means that every point of the panel has three other symmetrical points in the horizontal plane.

For example, point $A_1$ is symmetrical to points $A_2$, $B_2$ and $B_1$. Lamps 12 and 14 are chosen to possess equal qualities of illumination, therefore these four symmetrical points must be the same. We stress that the illumination, E, at every point An originates from both lamps 12 and 14. At any point An, the illumination is equal to the following equation: $E_{An} = E_{14} + E_{12}$, where $E_{14}$ is the illumination that originates directly from lamp 14 and $E_{12}$ is the illumination that originates directly from lamp 12 without having been reflected off of light-directing panel 8.

Figure 12:
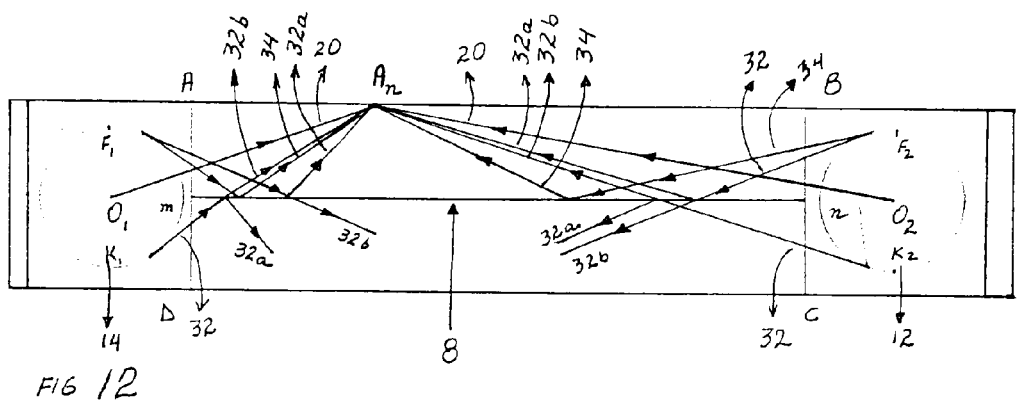
FIG. 12 is a cutaway plan view of the light box depicting the types of the main rays that fall on any point of the panel $A_n$

But, at every point An, there are also rays that are reflected off of light-directing panel 8, as can be seen in FIG. 12. FIG. 12 shows that at any point, An, of any of the display signs, for example AB, there are four kinds of rays:

1. rays 20 that are originated directly from lamps 12 and 14;
2. rays 34 that are reflected from the non-transparent parts (N) of light-directing panel 8;
3. rays 32a that are reflected from the transparent parts (T) of light-directing panel 8; and
4. rays 32b that come from the back side of the light-directing panel 8.

The illumination (E) of a point An equals the following equation: $E_{An} = E_{20} + E_{34} + E_{32a} + E_{32b}$ If the double-sided light-directing panel 8 is not utilized, the illumination of a point An would equal the following equation: $E_{An} = E_{20}$. Here we are not mentioning the rays that would be re-reflected from one display sign to another in case of the absence of the light-directing panel 8.

Figure 13:
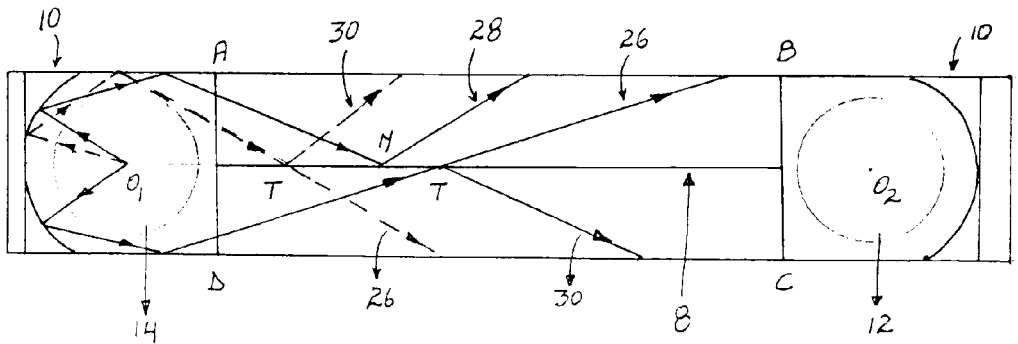
FIG. 13 is a cutaway plan view of the light box depicting the horizontal plane of the rays that originate from the back parts of the lamps.

The parabolic shaped parts of the aluminum frame 10 that are located at the back of the lamps, reflect the rays that originate from the back of the lamps, and send them to the front of the lamps as illustrated in FIG. 13, which translates to the rays next falling on the double-sided light-directing panel 8 to next be treated as rays coming off the front face of the lamps. The rays that will fall on the transparent parts (T) of the double-sided light-directing panel 8, are divided into rays 30 and 26. Ray 30 is the portion that is reflected back at the display signs that are located on this side of the box, and ray 26 is the ray portion that goes through the double-sided light-directing panel 8 and illuminates the display signs that are located on the other side of the light box. Ray 28 will fall on the non-transparent part (N) of the double-sided light-directing panel 8 and will not undergo a division, since the non-transparent part (N) of the light-directing panel 8 will not allow any part of this ray, to go through it. Thus, the illumination that originates from the back of the two lamps 12 and 14, is added to the above-mentioned illumination that originates from the front of these lamps.

Figure 14:
FIG. 14 is a cutaway plan view of the light box depicting a view of the rays that are parallel to axis $0_1 0_2$ of the lamps and also parallel to the double-sided light-directing panel.

Lamps 12 and 14, also emit rays that are parallel to the double-sided light-directing panel 8 or parallel to the axis $0_1 0_2$ of the lamps, as illustrated in FIG. 14. While traveling in this parallel manner, these rays will neither fall on display signs AB and CD, nor will they fall on the two surfaces of the double-sided light-directing panel 8, which would reflect back to the display signs. These rays, would thus, go back and forth from one lamp to the other. However, from these rays, during their trip from one lamp to the other, there are photons that will be released due to their contact with particles of air and these photons assist in the illumination of display signs AB and CD, as shown in FIG. 14.

As a further embodiment of the invention, in order to increase the illumination of the display signs AB and CD of the double-sided edge lighting-type display box 8, a way to divert these rays that are parallel to axis $0_1 0_2$ of the lamps, toward the said display signs has been developed. In order to achieve this, the double-sided light-directing panel 8 has been replaced with a new prismatic, four-sided light-directing panel 50, possessing a rhombus shaped base, as illustrated in FIG. 15.

Figure 15:
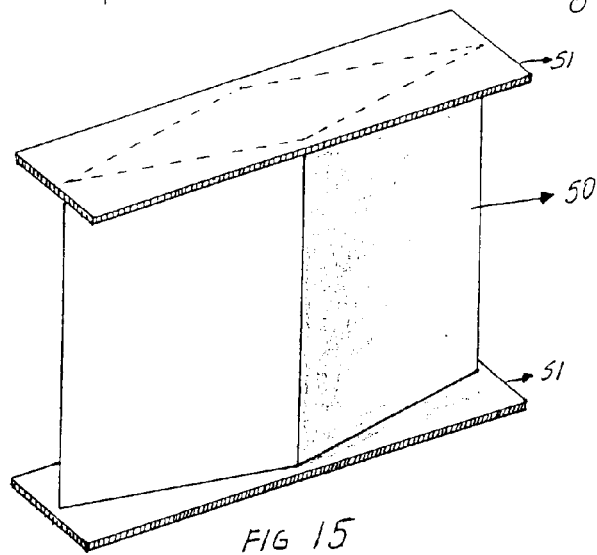
FIG. 15 is a perspective view of the four-sided light-directing panel and the plastic pieces that serve as a base and cover to the interior of the light box with the purpose of preventing stray rays from escaping and thus being recycled and reused for maximum illumination of the two signs.

FIG. 15 is a perspective view of the prismatic four-sided light-directing panel 50 where its fixtures 51 retain the light-directing panel within the aluminum frame of the double-sided edge lighting-type display box 1.

Figure 16:
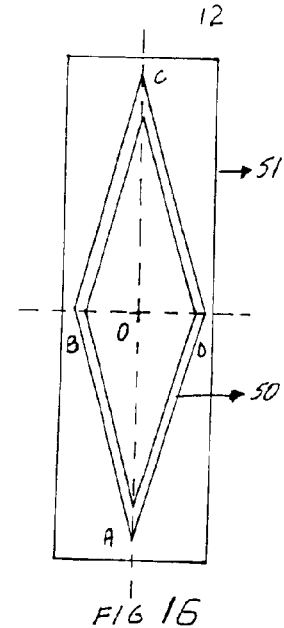
FIG. 16 is a horizontal view of the light box showing the four-sided panel.

FIG. 16 is a horizontal view of the prismatic light-directing panel 50 and the parallel component attached to its fixtures 51. AB, BC, CD and DA, as illustrated in FIG. 16, are the projections of the light-directing panel's four sides. Since the base 51 is rhombus shaped, simple geometry states that AB=BC=CD=DA. AC is the long diagonal of the rhombus and BD is the smaller diagonal of the rhombus. These are also the symmetrical axis of the rhombus and O is the projection of the cut of the diagonal planes of the rhombus. Point O is the center for the symmetry of the rhombus. Each side of the rhombus is symmetrical to the other three sides of the rhombus.

Surface AB is symmetrical to surface BC, surface CD and surface DA. It must be stressed that the small diagonal is in no circumstance any longer or shorter than the diameter of the lamps. The four-sided light-directing panel 50 is positioned, within the box, in such a way so that the diagonal plane AC falls exactly over the axis $O_1O_2$ of the lamps 12 and 14 as shown in FIGS. 3, 17, 18, 19, 20 and 21. The strategic positioning of the four-sided light-directing panel 50 protects the symmetry of the entire box, which also ensures the symmetry of the illumination of the display signs AB and CD. The axis $O_1O_2$ divides each of the components of the box into two symmetrical parts: the aluminum frame 10, the lamps 12 and 14 as well as the four-sided light-directing panel 50.

Figure 17:
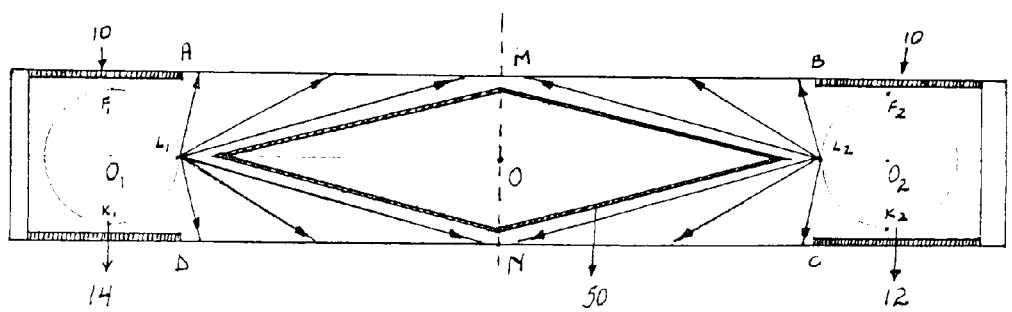
FIG. 17 is a cutaway plan view of the light box depicting the rays that originate from points $L_1$ and $L_2$ of the lamps that are located on their axis $0_1 0_2$

In FIG. 17, a horizontal view of the cut of the box, with the light-directing panel 50, chord and corresponding radial area $F_1L_1$ of lamp 14 is symmetrical to chord and corresponding radial area $L_1K_1$ of this same lamp. Proportionally, the same holds true for lamp 12 and thus chord and corresponding radial area $F_2L_2$ is symmetrical to chord and corresponding radial area $L_2K_2$ of the same lamp 12 and thus, in connection to axis $O_1O_2$ of these lamps, every point on $F_1L_1$ has a symmetrical point in part $K_1L_1$ and every point in $F_2L_2$ has a symmetrical point in $L_2K_2$. The illumination that comes from these points is symmetrical and equal in quantity. Point $L_1$ and point $L_2$ are symmetrical and are positioned exactly on axis $O_1O_2$ of the lamps 12 and 14.

In FIG. 17 the rays that originate from points $L_2$ and $L_1$ of the lamps 12 and 14 respectively, fall mainly on signs AB and CD of the light box, without undergoing reflection from the four-sided light-directing panel 50. The amount of illumination that comes from these rays is the same for both display signs. The quantity of the illumination on segment AM of display sign surface AB equals the illumination on segment MB of surface AB. Also, the quantity of the illumination, on segment CN of display sign surface CD equals the illumination on segment ND of surface CD. Thus,

*AB=AM+MB* and *CD=CN+ND*.

Figure 18:
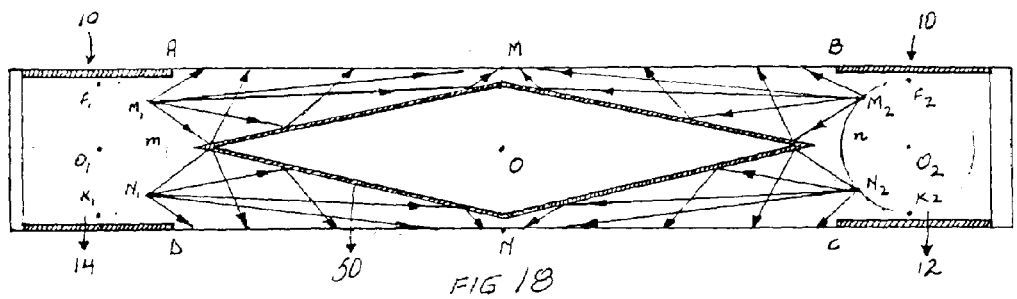
FIG. 18 is a cutaway plan view of the light box depicting the rays that originate from two points symmetrical to axis $0_1 0_2$ of the lamps, for each lamp.

Next, utilizing FIG. 18 we analyze the illumination of two points symmetrical to axis $O_1O_2$ of lamps 12 and 14 for each lamp. Points $M_1$ and $N_1$ for lamp 14 and points $M_2$ and $N_2$ for lamp 12, will be chosen as examples. The rays that originate from these symmetrical points, are symmetrical. These rays, either fall on display signs AB and CD or fall on the surfaces of the four-sided light-directing panel 50, which in turn reflects them towards display signs AB and CD in a symmetrical manner. Therefore, the illumination of parts AM, MB, CN and ND is symmetrical and equal in value as well.

Figure 19:
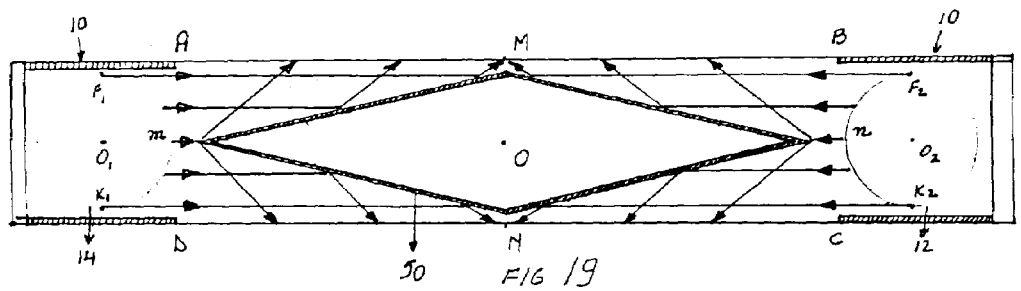
FIG. 19 is a cutaway plan view of the light box depicting the rays parallel to the axis $0_1 0_2$ of the lamps.
Figure 20:
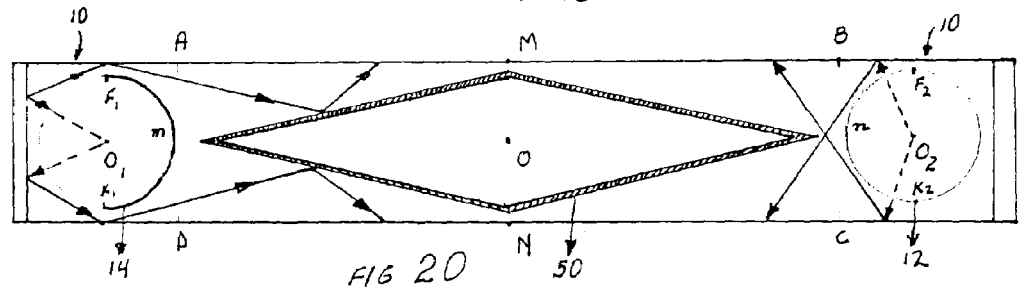
FIG. 20 is a cutaway plan view of the light box depicting the rays that originate from the back parts of the lamps that are reflected from the aluminum parts of the box that are located behind the lamps.

In FIG. 19 the rays that originate from the front parts of the lamps, $F_1mK_1$ of lamp 14 and $F_2nK_2$ of lamp 12 are parallel to axis $O_1O_2$ of lamps 12 and 14. These parallel rays fall on the sides of the four-sided light-directing panel 50 and are reflected toward display signs AB and CD in a symmetrical manner. Therefore, with the four-sided light-directing panel 50, it is possible to illuminate signs AB and CD with the rays parallel to axis $O_1O_2$ of the lamps, something that was impossible with the double-sided light-directing panel 8. We conclude that all of the rays that originate from parts $F_1mK_1$ of lamp 14 and $F_2nK_2$ of lamp 12, fall on surfaces AB and CD of the light box, either directly from the lamp or reflected off of the four-sided light-directing panel 50, achieving the brightest illumination possible.

As above mentioned, the aluminum frame of the double-sided edge lighting-type display box, is designed with a parabolic shape at the back side of the lamps, and this shape allows for reflection the rays that originate from the back side of the lamps 12 and 14. Some of those rays will fall directly on the display signs AB and CD (FIG. 20) and some will fall on the surfaces of the four-sided light-directing panel 50, which will reflect them towards surfaces AB and CD of the double-sided edge lighting-type display box. We conclude that the rays that originate from the back side of the lamps 12 and 14 add to the rays that originate from the front side of the lamps 12 and 14, therefore the brightest illumination possible is achieved.

Figure 21:
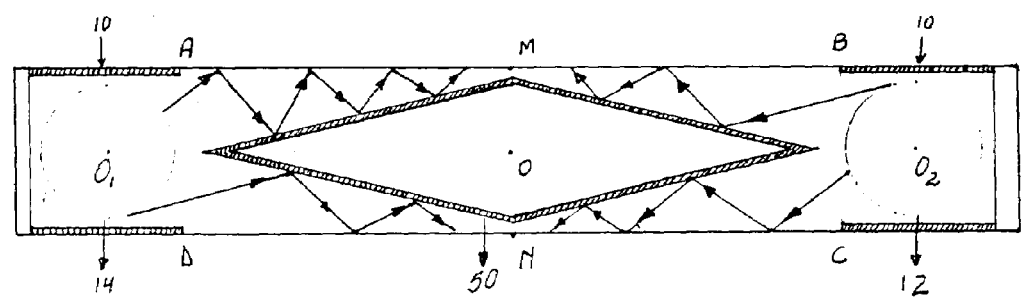
FIG. 21 is a cutaway plan view of the light box depicting the multiple reflections that the rays undergo when the four-sided panel is utilized and signs AB and CD of the box.

FIG. 21 is a cutaway plan view of the light box, illustrating the re-reflections of the rays that occur between surfaces AB and CD of the light box and the surfaces of the four-sided light-directing panel 50 which means, that each ray has multiple affects on surfaces AB and CD.

As stated above, the utility of the four-sided light-directing panel 50 is the superior illumination of signs AB and CD. For this reason, the preferred embodiment of the four-sided light-directing panel 50 possesses surfaces covered with a white fluorescent paint, similar to that used on the street signs to enhance night vision. When used on street signs, this white fluorescent paint achieves its objective because of its strong qualities of reflecting back the automobile light shined upon it. These same reflective qualities serve the instant invention well. The rays that originate from lamps 12 and 14 will ergo be strongly reflected toward the signs AB and CD of the light box.

Surfaces AB and CD of the housing are made of two plastic sheets, ranging in thickness from 1.5 mm to 2 mm, within which is placed the picture to be illuminated. The picture must either be printed on special paper that is transparent or opaque, or the picture can be printed on a film. The placement of the stamped picture within the two plastic sheets, keeps it straight, which means it will not be bent or deformed and will also be protected from the forces of nature, such as moisture, dust, smog, and temperature fluctuations, etc.

The double-sided, lighting-type display box, presented in this application is mainly used for interior areas, for example, stores, auditoriums, hallways etc. In smaller areas, where high illumination is not required, the use of the two-sided light-directing panel 8 is recommended, whereas in the larger areas, where higher amounts of illumination are required, the use of the four-sided light-directing panel 50 is recommended.

An advantage of this double-sided edge lighting-type display box stems from the fact instead of having two different one-sided light boxes, we use one two-sided light box, which is thinner than the traditional double-sided light-display boxes. The fact that this box is extremely light, allows the user to move it to different places, as needed without major exertion. Due to its slim design and low weight, the box can easily be hung from the ceiling, it can be stacked on other light boxes, it can be placed on the floor or on a counter using an aluminum base that will be provided to the owner, or it could also be fixed on a wall. The most important advantage of this invention lies in the fact that in order to change the picture, the help of a specialist will not be needed, as the design lends itself to ease of change by the owners themselves. Due the materials used and simplicity of design, the cost of an individual unit is low and the light box saves in electricity since it can operate with only two fluorescent lamps.

As such, the method of making and using the device detailed above constitutes the inventor's preferred embodiment and alternate embodiments to the invention. The inventor is aware that numerous configurations of the device as a whole or some of its constituent parts are available which would provide the desired results. While the invention has been described and illustrated with reference to specific embodiments, it is understood that these and other embodiments may be resorted to without departing from the invention. Therefore, the form of the invention set out above should be considered illustrative and not as limiting the scope of the following claims.

What I claim is:

1. A double-sided edge lighting-type display box comprising:
   two display signage panels, having a desired design face, wherein said two display signage panels are constructed of two sheets of plastic material, with a width of 2 mm each, that allow the desired picture to be placed and held tightly between them;
   at least two light sources offset from and behind said two display signage panels; and
   a light directing panel located behind at least one of said two display signage panels, whereby light directly incident on said at least one display signage from said at least two light sources and redirected light from said light-directing panel backlight and illuminate said two display signage panels, or at least one display signage panel.

2. A double-sided edge lighting-type display box comprising:
   two display signage panels, having a desired design face;
   at least two light sources offset from and behind said two display signage panels; and
   a light directing panel located behind at least one of said two display signage panels, wherein
      said light-directing panel comprises two sides, and wherein at least a portion of said light-directing panel is substantially transparent for allowing light incident thereon to pass through said light-directing panel and toward said display signage panel, whereby light directly incident on said at least one display signage from said at least two light sources and redirected light from said light-directing panel backlight and illuminate said two display signage panels, or at least one display signage panel.

3. A double-sided edge lighting-type display box comprising:
   two display signage panels, having a desired design face;
   at least two light sources offset from and behind said two display signage panels, wherein the distance between said light sources is less than sixty-five (65) percent of the length of the said two light sources; and
   a light directing panel located behind at least one of said two display signage panels, wherein said light-directing panel comprises two sides, whereby light directly incident on said at least one display signage from said at least two light sources and redirected light from said light-directing panel backlight and illuminate said two display signage panels, or at least one display signage panel.

4. A double-sided edge lighting-type display box comprising:
   two display signage panels, having a desired design face;
   at least two light sources offset from and behind said two display signage panels,
      wherein said two display signage panels are substantially as tall as a glass portion of the said two light sources; and
   a light directing panel located behind at least one of said two display signage panels,
   whereby light directly incident on said at least one display signage from said at least two light sources and redirected light from said light-directing panel backlight and illuminate said two display signage panels, or at least one display signage panel.

5. A double-sided edge lighting-type display box comprising:
   two display signage panels, having a desired design face;
   at least two light sources offset from and behind said two display signage panels;
   a light directing panel located behind at least one of said two display signage panels,
   wherein said light-directing panels have substantially the same height as the glass portion of the said two light sources, and wherein said light-directing panel comprises two sides, whereby light directly incident on said at least one display signage from said at least two light sources and redirected light from said light-directing panel backlight and illuminate said two display signage panels, or at least one display signage panel.

6. A double-sided edge lighting-type display box comprising:
   two display signage panels, having a desired design face;
   at least two light sources offset from and behind said two display signage panels,
      wherein the distance between said light sources is less than sixty-five (65) percent of the length of the said two light sources; and
   a light directing panel located behind at least one of said two display signage panels,
   wherein said light-directing panel comprises four sides, whereby light directly incident on said at least one display signage from said at least two light sources and redirected light from said light-directing panel backlight and illuminate said two display signage panels, or at least one display signage panel.

7. A double-sided edge lighting-type display box comprising:
   two display signage panels, having a desired design face;
   at least two light sources offset from and behind said two display signage panels;
   a light directing panel located behind at least one of said two display signage panels,
   wherein said light-directing panels have substantially the same height as the glass portion of the said two light sources, and wherein said light-directing panel comprises four sides, whereby light directly incident on said at least one display signage from said at least two light sources and redirected light from said light-directing panel backlight and illuminate said two display signage panels, or at least one display signage panel.

* * * * *